(12) United States Patent
Yao

(10) Patent No.: US 12,375,197 B2
(45) Date of Patent: Jul. 29, 2025

(54) DETECTION SYSTEM FOR VEHICLE-MOUNTED ETHERNET LINK SYNCHRONIZATION SIGNAL

(71) Applicant: Saijie Yao, Shanghai (CN)

(72) Inventor: Saijie Yao, Shanghai (CN)

(73) Assignee: Motorcomm (shanghai) Electronic Technology CO. LTD, Shanghai (CN)

(*) Notice: Subject to any disclaimer, the term of this patent is extended or adjusted under 35 U.S.C. 154(b) by 71 days.

(21) Appl. No.: 18/544,033

(22) Filed: Dec. 18, 2023

(65) Prior Publication Data

US 2025/0202608 A1 Jun. 19, 2025

(51) Int. Cl.
*H04J 3/06* (2006.01)

(52) U.S. Cl.
CPC ........... *H04J 3/0608* (2013.01); *H04J 3/0611* (2013.01); *H04J 3/0661* (2013.01)

(58) Field of Classification Search
None
See application file for complete search history.

(56) References Cited

U.S. PATENT DOCUMENTS

| 2013/0343432 A1* | 12/2013 | Deng | H04L 27/2602 |
| | | | 375/146 |
| 2016/0021632 A1* | 1/2016 | Sun | H04L 43/16 |
| | | | 370/350 |
| 2020/0229180 A1* | 7/2020 | Liu | H04L 5/0092 |
| 2021/0320749 A1* | 10/2021 | Liu | H04L 1/0023 |
| 2022/0070805 A1* | 3/2022 | Ohara | H04W 48/08 |

* cited by examiner

*Primary Examiner* — Quang N Nguyen
(74) *Attorney, Agent, or Firm* — Clement Cheng

(57) ABSTRACT

The invention relates to the technical field of vehicle-mounted Ethernet communication, in particular to a detection system for a vehicle-mounted Ethernet link synchronizing signal, which comprises a signal characteristic judgment module, the signal characteristic judgment module generates a synchronization mode identifier according to the signal characteristic of the synchronizing signal; a rate judgment module, the rate judgment module generates a working rate identifier according to the synchronizing signal; and a synchronization module, the synchronization module is respectively connected with the signal characteristic judgment module and the rate judgment module, and the synchronization module generates synchronization information for handshake between the vehicle-mounted Ethernet device and the external device according to the synchronization mode identifier and the working rate identifier and outputs the synchronization information.

7 Claims, 6 Drawing Sheets

DETECTION SYSTEM FOR VEHICLE-MOUNTED ETHERNET LINK SYNCHRONIZATION SIGNAL

BACKGROUND OF THE INVENTION

1. Field of the Invention

The present invention relates to the technical field of vehicle-mounted Ethernet communication, particularly to a detection system for a vehicle-mounted Ethernet link synchronizing signal.

2. Description of the Related Art

Vehicle-mounted Ethernet is a novel local area network technology used to connect in-vehicle electronic control units (ECUs) via Ethernet. Unlike conventional Ethernet technology, which utilizes 4 pairs of unshielded twisted pairs to transmit data, vehicle-mounted Ethernet achieves data transfer rates of 100 Mb/s or even 1 Gb/s on a single pair of unshielded twisted pairs. Compared to conventional Ethernet, it is more adaptable to the automotive environment, meeting the automotive industry's requirements for high reliability, low electromagnetic radiation, low power consumption, bandwidth allocation, low latency, and synchronous real-time capabilities.

In existing technologies, for vehicle-mounted Ethernet device, there are different handshake modes depending on the parameters of each manufacturer and device. These modes include auto-negotiation mode and forced mode. To achieve better compatibility with different handshake protocols, Ethernet devices are typically configured with corresponding signal detection methods, to determine the communication mode that the remote device can adopt by detecting the corresponding signal.

However, in the actual implementation process, the inventor found that, with the development of vehicle-mounted Ethernet device and the iteration of communication standards, the communication speed and standards supported by vehicle-mounted Ethernet device may gradually expand from the original 100BASE-T1, 1000BASE-T1 to 2.5G/5G/10GBASE-T1. With the expansion of communication protocols, the parallel detection process for synchronous signals has become increasingly complex, leading to the problem that the existing technology's solution of only parallel detection for the first and second types of signals is not effective.

SUMMARY OF THE INVENTION

In response to the issues present in existing technologies, a detection system for vehicle-mounted Ethernet link synchronization signal is now provided.

The technical solution is as follows:
a detection system for vehicle-mounted Ethernet link synchronization signal, suitable for vehicle-mounted Ethernet device to determine synchronization signal sent by external device, comprising:
a signal characteristic judgment module, the signal characteristic judgment module generates a synchronization mode identifier according to the signal characteristic of the synchronizing signal;
a rate judgment module, the rate judgment module generates a working rate identifier according to the synchronizing signal;
a synchronization module, wherein the synchronization module is respectively connected with the signal characteristic judgment module and the rate judgment module, and the synchronization module generates synchronization information for handshake between the vehicle-mounted Ethernet device and the external device according to the synchronization mode identifier and the working rate identifier and outputs the synchronization information;
the synchronization mode identifier comprises a continuous signal and a pulse signal;
the rate judgment module further comprises a continuous signal detection module, and the continuous signal detection module is connected to the signal characteristic judgment module;
when the synchronization mode identifier indicates as the continuous signal, the continuous signal detection module directly outputs a pre-configured continuous signal pattern rate, which functions as the working rate identifier, to the synchronization module.

On the other hand, the signal characteristic judgment module comprises:
a timing module, the timing module generates a clock signal;
a counting module, the counting module is connected to the timing module and generates periodic counting results based on the input clock signal and synchronization signal to function as the signal characteristic;
a judgment module, the judgment module generates the synchronization mode identifier based on the signal characteristic.

On the other hand, the rate judgment module comprises:
a sampling module, the sampling module samples the synchronization signal to form a sampling data;
a decision module, the decision module generates a PN sequence based on the sampling data;
a detection module, the detection module is connected to the decision module and generates the working rate identifier based on the PN sequence.

On the other hand, the rate judgment module further comprises:
a gain control module, an input terminal of the gain control module receives the synchronization signal, and an output terminal of the gain control module is connected to an input terminal of the sampling module;
the gain control module generates a gain parameter based on a signal amplitude of the synchronization signal and a pre-set sampling range corresponding to the sampling range of the sampling module;
the gain control module adjusts a gain value of the synchronization signal using the gain parameter, and outputs the gain value to the sampling module.

On the other hand, the rate judgment module further comprises:
a sampling clock generation module, the sampling clock generation module generates a sampling clock signal;
a clock recovery module, the clock recovery module is connected to the sampling clock generation module, and the clock recovery module adjusts the sampling clock signal based on a pre-configured optimal sampling parameter so as to generate an adjusted clock signal;
the sampling module receives the adjusted clock signal, and samples the synchronization signal based on the adjusted clock signal to obtain the sampling data.

On the other hand, the rate judgment module further comprises:

an equalization module, an input terminal of the equalization module is connected to the sampling module, and an output terminal of the equalization module is connected to the decision module;

the equalization module obtains the sampling data, and eliminates an inter-symbol interference from the sampling data to output the sampling data to the decision module.

On the other hand, the equalization module comprises:

a forward equalizer, the forward equalizer is connected to the sampling module, the forward equalizer obtains the sampling data, and the forward equalizer eliminates forward symbol interference from the sampling data to generate an intermediate equalized data;

a decision feedback filter, the decision feedback filter is connected to the forward equalizer, the decision feedback filter eliminates backward symbol interference from the intermediate equalized data to output the intermediate equalized data which functions as the sampling data with the inter-symbol interference eliminated.

On the other hand, the continuous signal detection module is also connected to the sampling module, the decision module, and the detection module respectively;

when the synchronization mode identifier indicates as a continuous signal, the continuous signal detection module further controls the sampling module, the decision module, and the detection module to cease processing the synchronization signal.

On the other hand, the detection module comprises:

a reference signal generation module, the reference signal generation module sequentially generates pre-configured reference sequence signals;

the reference sequence signals correspond to the synchronization signal under different working rates of the Ethernet device respectively, an auto-correlation module, the auto-correlation module is connected to the reference signal generation module and the decision module respectively, the auto-correlation module performs sliding auto-correlation processing on the reference sequence signals and the PN sequence to obtain an auto-correlation result;

a detection judgment module, the detection judgment module is connected to the reference signal generation module and the auto-correlation module respectively, the detection judgment module determines whether the working rate corresponding to the PN sequence is obtained based on the auto-correlation result, if the working rate is obtained, the detection judgment module generates the working rate identifier based on the working rate;

if the working rate is not obtained, the detection judgment module controls the reference signal generation module to generate new reference sequence signals.

The method has the beneficial effects that aiming at the problem that a parallel detection scheme in the prior art is poor in effect, the signal characteristic judgment module and the rate judgment module are respectively constructed in the detection system, and the synchronous signal is judged based on the working mode and the working rate corresponding to the signal characteristic, so that a good detection effect on a plurality of synchronization signal is realized.

BRIEF DESCRIPTION OF THE DRAWINGS

Referring to the accompanying drawings for a more comprehensive description of the embodiments of the present invention. However, the accompanying drawings are for illustration and explanation purposes only and do not limit the scope of the invention.

DETAILED DESCRIPTION

Below, the technical solutions in the embodiments of the present invention will be described clearly and comprehensively in conjunction with the accompanying drawings. It is obvious that the described embodiments are only a part of the embodiments of the present invention, not all of them. Based on the embodiments of the present invention, all other embodiments obtained by those skilled in the art without exercising creative labor are within the scope of protection of the present invention.

It should be noted that, in non-conflicting situations, embodiments in the present invention and features in these embodiments can be combined with each other.

The following, in conjunction with the drawings and specific embodiments, provides further explanation of the present invention but is not intended to limit the scope of the invention.

Figure 1:
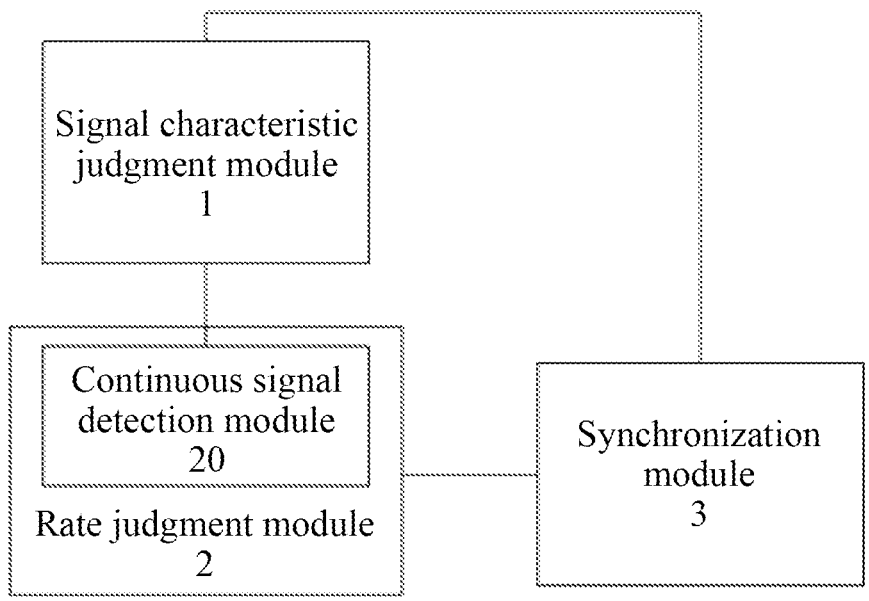
FIG. 1 is an overall schematic diagram of an embodiment of the present invention.

The invention includes:

a detection system for vehicle-mounted Ethernet link synchronization signal, suitable for vehicle-mounted Ethernet device to determine synchronization signal sent by external device, as shown in FIG. 1, comprising:

a signal characteristic judgment module 1, the signal characteristic judgment module 1 generates a synchronization mode identifier according to the signal characteristic of the synchronizing signal;

a rate judgment module 2, the rate judgment module 2 generates a working rate identifier according to the synchronizing signal;

a synchronization module 3, wherein the synchronization module 3 is respectively connected with the signal characteristic judgment module 1 and the rate judgment module 2, and the synchronization module 3 generates synchronization information for handshake between the vehicle-mounted Ethernet device and the external device according to the synchronization mode identifier and the working rate identifier and outputs the synchronization information;

the synchronization mode identifier comprises a continuous signal and a pulse signal;

the rate judgment module 2 further comprises a continuous signal detection module 20, and the continuous signal detection module 20 is connected to the signal characteristic judgment module 1;

when the synchronization mode identifier indicates as the continuous signal, the continuous signal detection module 20 directly outputs a pre-configured continuous signal pattern rate, which functions as the working rate identifier, to the synchronization module 3.

Specifically, in response to the problem of poor detection effectiveness of multiple vehicle Ethernet synchronization signal using parallel synchronization signal detection methods in the prior art, in this embodiment, a signal characteristic judgment module 1 is added to the detection system to judge the signal characteristic of the synchronization signal, thereby determining the working mode corresponding to part of the synchronization signal to function as the synchronization mode identifier. Additionally, a rate judgment module 2 further detects the synchronization signal to determine the working rate identifier corresponding to the synchronization signal. When both the synchronization mode identifier and the working rate identifier are obtained, the synchronization module 3 can obtain the actual working mode corresponding to the synchronization signal through table matching, and generate synchronization information for output, achieving a better process of detecting and judging the synchronization signal, and achieving good detection effectiveness of signal for various working modes such as 100BASE-T1, 1000BASE-T1, 2.5G/5G/10GBASE-T1.

Figure 2:
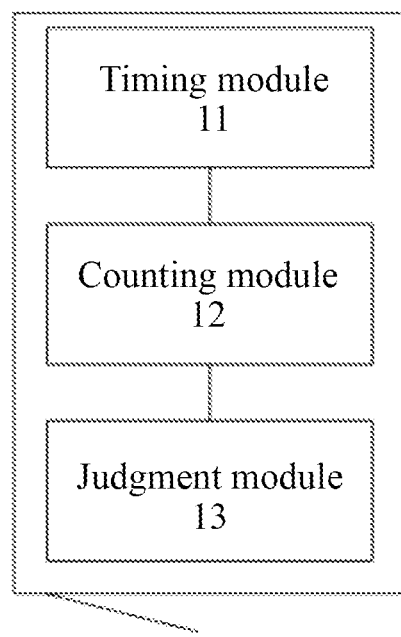
FIG. 2 is a schematic diagram of a signal characteristic judgment module in an embodiment of the present invention.

In an embodiment, as shown in FIG. 2, the signal characteristic judgment module 1 comprises:
  a timing module 11, the timing module 11 generates a clock signal;
  a counting module 12, the counting module 12 is connected to the timing module 11 and generates periodic counting results based on the input clock signal and synchronization signal to function as the signal characteristic;
  a judgment module 13, the judgment module 13 generates the synchronization mode identifier based on the signal characteristic.

Specifically, in response to the problem of poor detection effectiveness of multiple vehicle Ethernet synchronization signal using parallel synchronization signal detection methods in the prior art, the inventor further studied the synchronization signal under various working modes of vehicle-mounted Ethernet and found that only when the vehicle-mounted Ethernet device operates under the 100BASE-T1 standard, the signal characteristic of its synchronization signal exhibits a set of continuous signals, while under other standards, it exhibits pulse signals with different periods. Therefore, in this embodiment, by selecting and setting a timing module 11 and a counting module 12, the high levels of the synchronization signal within a certain period are read, and the counting result of the period is generated as the signal characteristic, thereby achieving better judgement effectiveness for the synchronization signal under the 100BASE-T1 standard and generating the corresponding synchronization mode identifier.

Figure 3:
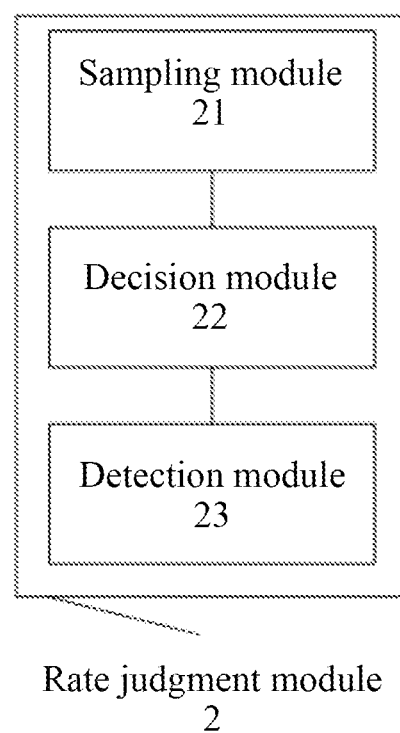
FIG. 3 is a schematic diagram of a rate judgment module in an embodiment of the present invention.

In an embodiment, as shown in FIG. 3, the rate judgment module 2 comprises:
  a sampling module 21, the sampling module 21 samples the synchronization signal to form a sampling data;
  a decision module 22, the decision module 22 generates a PN sequence based on the sampling data;
  a detection module 23, the detection module 23 is connected to the decision module 22 and generates the working rate identifier based on the PN sequence.

Specifically, in response to the problem of poor detection effectiveness of multiple vehicle Ethernet synchronization signal using parallel synchronization signal detection methods in the prior art, in this embodiment, the sampling module 21, decision module 22, and detection module 23 are sequentially connected to achieve the sampling of the synchronization signal, thereby obtaining the sampling data. Further, the sampling data is subjected to judgement to obtain the PN sequence actually transmitted by the remote device, and then the PN sequence is detected to determine the working rate adopted by the remote device to function as the working rate identifier, thereby achieving better detection performance of the synchronization signal at different rates.

Figure 4:
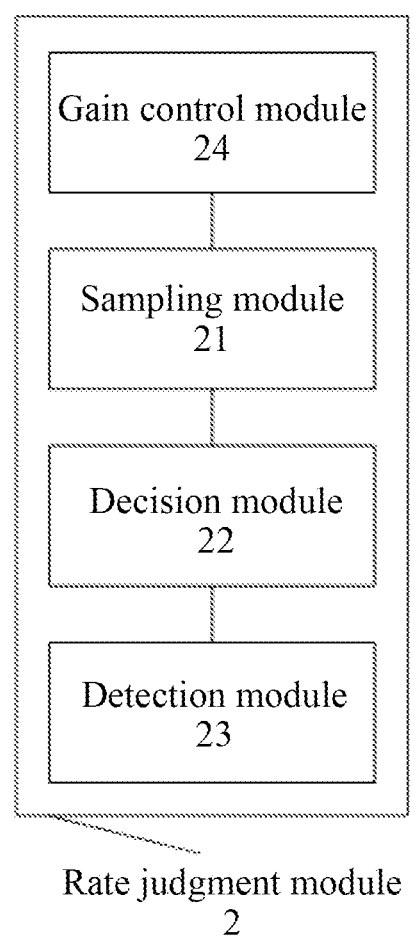
FIG. 4 is a schematic diagram of a gain control module in an embodiment of the present invention.

In an embodiment, as shown in FIG. 4, the rate judgment module 2 further comprises:
  a gain control module 24, an input terminal of the gain control module 24 receives the synchronization signal, and an output terminal of the gain control module 24 is connected to an input terminal of the sampling module 1;
  the gain control module 24 generates a gain parameter based on a signal amplitude of the synchronization signal and a pre-set sampling range corresponding to the sampling range of the sampling module 21;
  the gain control module 24 adjusts a gain value of the synchronization signal using the gain parameter, and outputs the gain value to the sampling module.

Specifically, in the actual vehicle-mounted environment, factors such as transmission medium, environment, and remote device models can affect the gain value of the synchronization signal, causing it to deviate from the sampling range of sampling module 21. In this embodiment, a gain control module 24 is further added to the front stage of sampling module 21. This gain control module 24 can determine whether the synchronization signal meets the sampling range of the sampling module 21 based on its signal amplitude. When the signal amplitude is below the sampling range, positive gain parameters are added, and when the signal amplitude is above the sampling range, negative gain parameters are added to process the synchronization signal. This avoids the problem of inaccurate sampling caused by the synchronization signal deviating from the normal sampling range.

Figure 5:
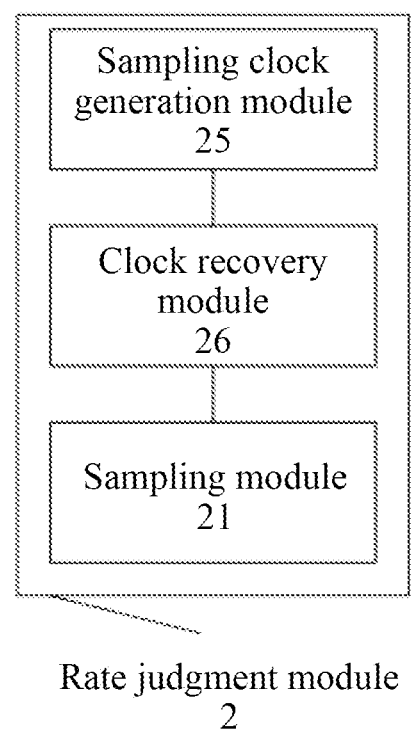
FIG. 5 is a schematic diagram of a clock recovery module in an embodiment of the present invention.

In an embodiment, as shown in FIG. 5, the rate judgment module 2 further comprises:
  a sampling clock generation module 25, the sampling clock generation module 25 generates a sampling clock signal;
  a clock recovery module 26, the clock recovery module 26 is connected to the sampling clock generation module 25, and the clock recovery module 26 adjusts the sampling clock signal based on a pre-configured optimal sampling parameter so as to generate an adjusted clock signal;
  the sampling module 21 receives the adjusted clock signal, and samples the synchronization signal based on the adjusted clock signal to obtain the sampling data.

Specifically, to achieve better sampling performance for the synchronization signal, in this embodiment, a sampling clock generation module 25 is further configured in the rate judgment module 2 to generate a sampling clock signal. A clock recovery module 26 is used to adjust the sampling clock signal, so that the clock signal input to the sampling module 21 remains near the optimal sampling point of the sampling module 21, thereby achieving better sampling performance.

Figure 6:
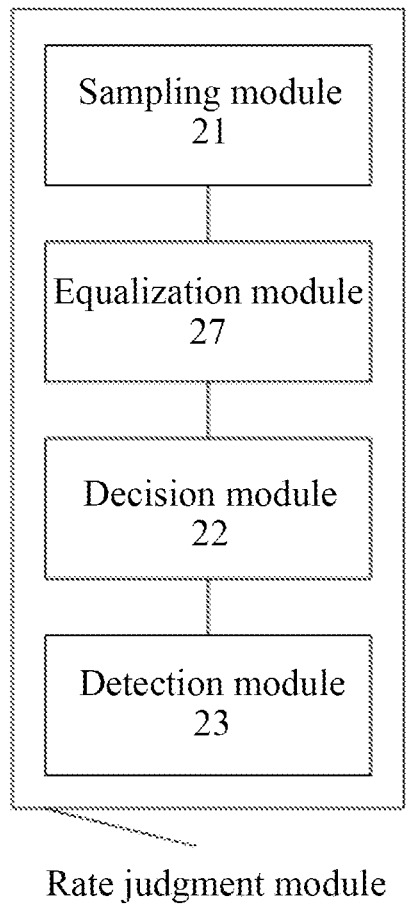
FIG. 6 is a schematic diagram of an equalization module in an embodiment of the present invention.

In an embodiment, as shown in FIG. 6, the rate judgment module 2 further comprises:
- an equalization module 27, an input terminal of the equalization module 27 is connected to the sampling module 21, and an output terminal of the equalization module 27 is connected to the decision module 22;
- the equalization module 27 obtains the sampling data, and eliminates an inter-symbol interference from the sampling data to output the sampling data to the decision module 22.

Specifically, to address the issue of inter-symbol interference in the synchronization signal in the actual vehicle-mounted environment, in this embodiment, an equalization module 27 is further added between the sampling module 21 and the decision module 22. The equalization module 27 is used to eliminate inter-symbol interference in the sampling data to output the sampling data to the decision module 22, thereby enabling subsequent modules to achieve better processing performance.

Figure 7:
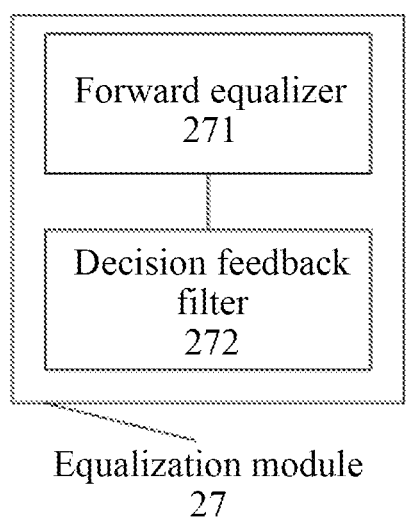
FIG. 7 is a schematic diagram of a sub-module of the equalization module in an embodiment of the present invention.

In an embodiment, as shown in FIG. 7, the equalization module 27 comprises:
- a forward equalizer 271, the forward equalizer 271 is connected to the sampling module 21, the forward equalizer 271 obtains the sampling data, and the forward equalizer eliminates forward symbol interference from the sampling data to generate an intermediate equalized data;
- a decision feedback filter 272, the decision feedback filter 272 is connected to the forward equalizer 271, the decision feedback filter eliminates backward symbol interference from the intermediate equalized data to output the intermediate equalized data which functions as the sampling data with the inter-symbol interference eliminated.

Specifically, to address the issue of inter-symbol interference in the synchronization signal in the actual vehicle-mounted environment, in this embodiment, the forward equalizer 271 is set up to eliminate forward symbol interference in the sampling data. It is combined with the decision feedback filter 272 to eliminate backward symbol interference, thereby achieving better elimination of inter-symbol interference.

Figure 8:
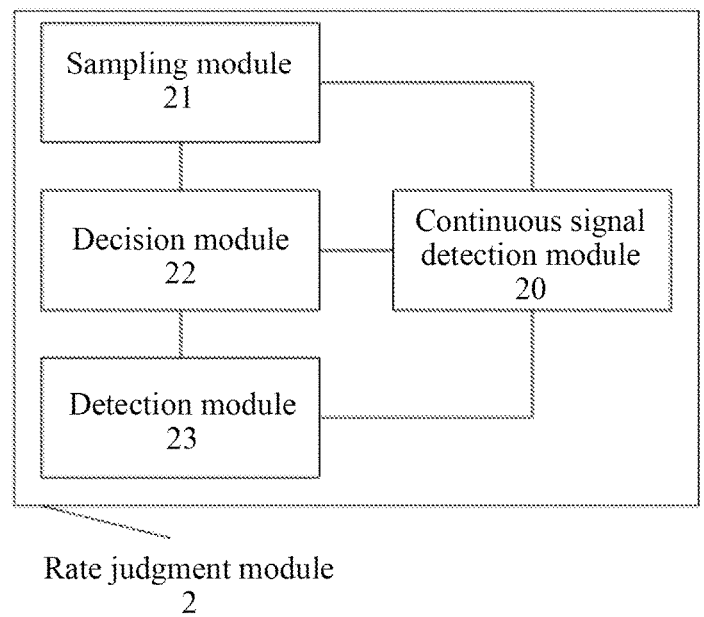
FIG. 8 is a schematic diagram of a continuous signal detection module in an embodiment of the present invention.

In an embodiment, as shown in FIG. 8, the continuous signal detection module 20 is also connected to the sampling module 21, the decision module 22, and the detection module 23 respectively;
- when the synchronization mode identifier indicates as a continuous signal, the continuous signal detection module 20 further controls the sampling module 21, the decision module 22, and the detection module 23 to cease processing the synchronization signal.

Specifically, to achieve faster processing efficiency, in this embodiment, a continuous signal detection module 20 is further added to the rate judgement module 2. This continuous signal detection module 20 detects the synchronous mode identifier output by the signal characteristic judgment module 1, and when the synchronization mode identifier indicates as a continuous signal, i.e., indicating that the synchronization signal corresponds to the synchronization signal of 100BASE-T1, it directly outputs a 100 M rate, which functions as the working rate identifier, to the synchronization module 3. It also controls the sampling module 21, decision module 22, and detection module 23 to cease sampling the synchronization signal, thereby improving processing efficiency.

Figure 9:
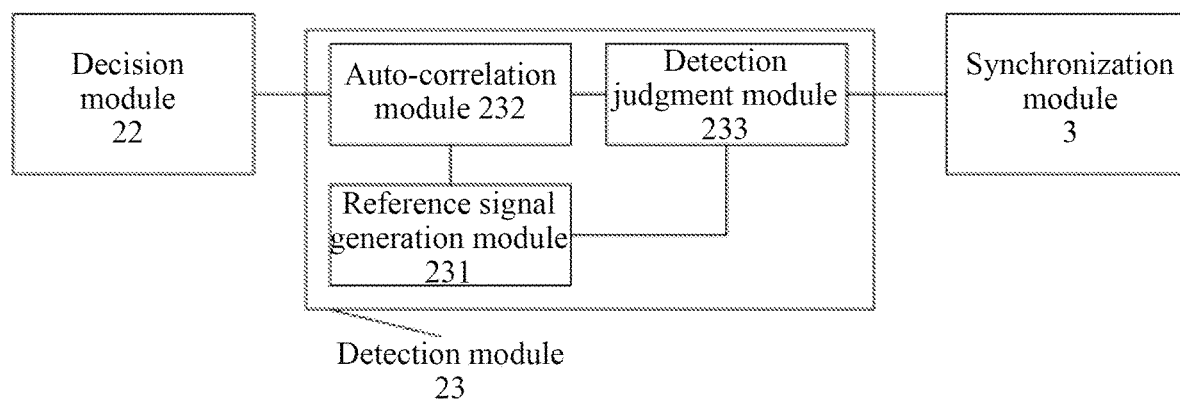
FIG. 9 is a schematic diagram of a detection module in an embodiment of the present invention.

In an embodiment, as shown in FIG. 9, the detection module 23 comprises:
- a reference signal generation module 231, the reference signal generation module 231 sequentially generates pre-configured reference sequence signals;
- the reference sequence signals correspond to the synchronization signal under different working rates of the Ethernet device respectively,
- an auto-correlation module 232, the auto-correlation module 232 is connected to the reference signal generation module 231 and the decision module 22 respectively, the auto-correlation module 232 performs sliding auto-correlation processing on the reference sequence signals and the PN sequence to obtain an auto-correlation result;
- a detection judgment module 233, the detection judgment module 233 is connected to the reference signal generation module 231 and the auto-correlation module 232 respectively, the detection judgment module 232 determines whether the working rate corresponding to the PN sequence is obtained based on the auto-correlation result,
- if the working rate is obtained, the detection judgment module 233 generates the working rate identifier based on the working rate;
- if the working rate is not obtained, the detection judgment module 233 controls the reference signal generation module to generate new reference sequence signals.

Specifically, to achieve better detection performance for the working rates of various synchronization signals, in this embodiment, a reference signal generation module 231 is further set up in the detection module to generate reference sequence signals corresponding to synchronization signals with different rates. The PN sequence and reference sequence signals are subjected to sliding auto-correlation processing by the auto-correlation module 232, and then they are judged by the detection judgment module 233 until a matching reference sequence signal is found, thereby achieving better detection process for the working rate.

The above is only a preferred embodiment of the present invention, and it does not limit the implementation and scope of protection of the present invention. For those skilled in the art, it should be recognized that any solutions obtained by equivalent substitutions and obvious changes made based on the disclosure and illustrations of the present invention should be included within the scope of protection of the present invention.

What is claimed is:

1. A detection system for vehicle-mounted Ethernet link synchronization signal, suitable for a vehicle-mounted Ethernet device to determine synchronization signal sent by an external device, comprising:
   one or more processors coupled to one or more memory devices;
   a signal characteristic judgment module, the signal characteristic judgment module generates a synchronization mode identifier according to the signal characteristic of the synchronization signal;
   a rate judgment module, the rate judgment module generates a working rate identifier according to the synchronization signal;
   a synchronization module, wherein the synchronization module is respectively connected with the signal characteristic judgment module and the rate judgment module, and the synchronization module generates synchronization information for handshake between the vehicle-mounted Ethernet device and the external device according to the synchronization mode identifier and the working rate identifier and outputs the synchronization information;

the synchronization mode identifier comprises a continuous signal and a pulse signal;

the rate judgment module further comprises a continuous signal detection module, and the continuous signal detection module is connected to the signal characteristic judgment module;

when the synchronization mode identifier indicates as the continuous signal, the continuous signal detection module directly outputs a pre-configured continuous signal pattern rate, which functions as the working rate identifier, to the synchronization module;

wherein the signal characteristic judgment module comprises:
a timing module, the timing module generates a clock signal;
a counting module, the counting module is connected to the timing module and generates periodic counting results based on the input clock signal and synchronization signal to function as the signal characteristic; and
a judgment module, the judgment module generates the synchronization mode identifier based on the signal characteristic;

wherein the rate judgment module comprises:
a sampling module, the sampling module samples the synchronization signal to form a sampling data;
a decision module, the decision module generates a PN sequence based on the sampling data; and
a detection module, the detection module is connected to the decision module and generates the working rate identifier based on the PN sequence.

2. The detection system of claim 1, wherein the rate judgment module further comprises: a gain control module, an input terminal of the gain control module receives the synchronization signal, and an output terminal of the gain control module is connected to an input terminal of the sampling module; the gain control module generates a gain parameter based on a signal amplitude of the synchronization signal and a pre-set sampling range corresponding to the sampling range of the sampling module; the gain control module adjusts a gain value of the synchronization signal using the gain parameter, and outputs the gain value to the sampling module.

3. The detection system of claim 1, wherein the rate judgment module further comprises: a sampling clock generation module, the sampling clock generation module generates a sampling clock signal; a clock recovery module, the clock recovery module is connected to the sampling clock generation module, and the clock recovery module adjusts the sampling clock signal based on a pre-configured optimal sampling parameter so as to generate an adjusted clock signal; the sampling module receives the adjusted clock signal, and samples the synchronization signal based on the adjusted clock signal to obtain the sampling data.

4. The detection system of claim 1, wherein the rate judgment module further comprises: an equalization module, an input terminal of the equalization module is connected to the sampling module, and an output terminal of the equalization module is connected to the decision module; the equalization module obtains the sampling data, and eliminates an inter-symbol interference from the sampling data to output the sampling data to the decision module.

5. The detection system of claim 4, wherein the equalization module comprises: a forward equalizer, the forward equalizer is connected to the sampling module, the forward equalizer obtains the sampling data, and the forward equalizer eliminates forward symbol interference from the sampling data to generate an intermediate equalized data; a decision feedback filter, the decision feedback filter is connected to the forward equalizer, the decision feedback filter eliminates backward symbol interference from the intermediate equalized data to output the intermediate equalized data which functions as the sampling data with the inter-symbol interference eliminated.

6. The detection system of claim 1, wherein the continuous signal detection module is also connected to the sampling module, the decision module, and the detection module respectively; when the synchronization mode identifier indicates as a continuous signal, the continuous signal detection module further controls the sampling module, the decision module, and the detection module to cease processing the synchronization signal.

7. The detection system of claim 1, wherein the detection module comprises: a reference signal generation module, the reference signal generation module sequentially generates pre-configured reference sequence signals; the reference sequence signals correspond to the synchronization signal under different working rates of the Ethernet device respectively, an auto-correlation module, the auto-correlation module is connected to the reference signal generation module and the decision module respectively, the auto-correlation module performs sliding auto-correlation processing on the reference sequence signals and the PN sequence to obtain an auto-correlation result; a detection judgment module, the detection judgment module is connected to the reference signal generation module and the auto-correlation module respectively, the detection judgment module determines whether the working rate corresponding to the PN sequence is obtained based on the auto-correlation result, if the working rate is obtained, the detection judgment module generates the working rate identifier based on the working rate; if the working rate is not obtained, the detection judgment module controls the reference signal generation module to generate new reference sequence signals.

* * * * *